United States Patent
Zaitsev (10) Patent No.: US 8,752,179 B2
(45) Date of Patent: Jun. 10, 2014

(54) SYSTEM AND METHOD FOR REMOVAL OF MALICIOUS SOFTWARE FROM COMPUTER SYSTEMS AND MANAGEMENT OF TREATMENT SIDE-EFFECTS

(71) Applicant: Kaspersky Lab ZAO, Moscow (RU)

(72) Inventor: Oleg V. Zaitsev, Smolensk (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/652,948

(22) Filed: Oct. 16, 2012

(65) Prior Publication Data

US 2013/0247193 A1   Sep. 19, 2013

(30) Foreign Application Priority Data

Mar. 14, 2012   (RU) ................................ 2012109476

(51) Int. Cl.
   *G06F 11/00*   (2006.01)
   *G06F 11/30*   (2006.01)
(52) U.S. Cl.
   USPC ............................................ 726/24; 713/188
(58) Field of Classification Search
   USPC ............................................ 726/24; 713/188
   See application file for complete search history.

(56) References Cited

U.S. PATENT DOCUMENTS

| | | | |
|---|---|---|---|
| 7,533,131 B2 | 5/2009 | Thomas et al. | |
| 7,540,030 B1 | 5/2009 | Zaitsev | |
| 7,584,508 B1 * | 9/2009 | Kashchenko et al. | .......... 726/25 |
| 7,836,500 B2 | 11/2010 | Nason et al. | |
| 7,934,229 B1 * | 4/2011 | Vogel | ............................ 725/24 |
| 7,934,261 B1 | 4/2011 | Saguiguit et al. | |
| 7,941,850 B1 | 5/2011 | Satish | |
| 8,220,053 B1 | 7/2012 | Sun et al. | |
| 8,234,238 B2 | 7/2012 | Keith | |
| 8,397,297 B2 * | 3/2013 | Williamson et al. | ............ 726/23 |
| 2003/0212906 A1 * | 11/2003 | Arnold et al. | ................. 713/201 |
| 2004/0148281 A1 * | 7/2004 | Bates et al. | ....................... 707/3 |
| 2006/0130141 A1 | 6/2006 | Kramer et al. | |
| 2007/0143843 A1 | 6/2007 | Nason et al. | |
| 2010/0077481 A1 | 3/2010 | Polyakov et al. | |
| 2010/0138926 A1 * | 6/2010 | Kashchenko et al. | .......... 726/25 |
| 2011/0197277 A1 * | 8/2011 | Figlin et al. | .................... 726/23 |
| 2012/0017276 A1 | 1/2012 | Baskar | |

FOREIGN PATENT DOCUMENTS

RU   101232   1/2011

\* cited by examiner

*Primary Examiner* — Techane Gergiso
(74) *Attorney, Agent, or Firm* — Patterson, Theunte, Pedersen, PA (57) ABSTRACT

Removing malware from a computer system. An inspection module obtains an inspection log representing operational history of the operating system and the application programs of the computer system. The inspection log is analyzed to detect a presence of any malware on the computer system. A treatment scenario is generated that defines a plurality of actions to be executed for removing any malware present on the computer system, as detected in the analyzing. The treatment scenario is generated based on the information contained in the inspection log and on a knowledge base of malware removal rules. The generated treatment scenario is evaluated to assess the actions defined in the generated treatment scenario that are associated with a risk of damaging the operating system or the application programs of the computer system. A modified treatment scenario can be created to reduce the risk in response to an assessment of the risk.

18 Claims, 3 Drawing Sheets

SYSTEM AND METHOD FOR REMOVAL OF MALICIOUS SOFTWARE FROM COMPUTER SYSTEMS AND MANAGEMENT OF TREATMENT SIDE-EFFECTS

PRIORITY APPLICATION

This application claims the benefit of Russian Federation Patent Application No. 2012109476 filed on Mar. 14, 2012, the disclosure of which is incorporated by reference herein.

FIELD OF THE INVENTION

This invention relates to anti-malware technologies, and more particularly, to malware removal tools that generate a customized treatment scenario for a specific computer system to be treated.

BACKGROUND OF THE INVENTION

With the increasing popularity of the Internet, there continues to be significant growth in services offered online: web banking allows customers to manage funds in their bank and brokerage accounts from a personal computer; various Internet payment systems, such as Yandex.money, Webmoney or PayPal, allow consumers to conveniently pay for goods and services from merchants from auction sites, etc. In addition, users run an ever increasing array of application software and save their important work product both locally on their personal computers, and on remote servers. Therefore, it is not surprising that there is also an ever increasing number of malicious applications intended to steal, extort and spy on important data.

In order to combat malicious programs, we have antivirus applications, which have existed for quite a long time, such as Kaspersky Internet Security, as well as products from Microsoft Corporation, Symantec, McAfee, Trend Micro, F-Secure, and many others. These security applications use a wide variety of detection and treatment technologies, including signature and heuristic checks, virtual machines and emulators, etc. These technologies provide efficient detection and removal of various malicious applications and the consequences of their operation.

However, it should be noted that the development of malicious applications is always evolving, and the creators of malicious applications use cutting-edge methods to avoid or counter antivirus applications. One such technique involves methods for spreading malicious applications which can actively infect files (i.e., viruses) or can be spread on the network and by email (i.e., worms). Additionally, the spread of malicious applications can exploit various vulnerabilities in operating system software and user applications, as well as social networks, targeting in particular lay persons without much expertise in computer security. Many malicious applications can be quite difficult to detect and remove, even for experts.

Malicious applications can be installed whose sole function is to provide remote control of the infected computer (i.e., backdoor), conceal certain objects or activities in the operating system (i.e., rootkits), or avoid performing actions that are obviously malicious (for example, fake antivirus applications), all of which makes detection more difficult. Code obfuscation also substantially complicates the detection of malicious applications, many of which consist of not just one executable file but may be composed of multiple related components, each of them executing its own part of the malicious functionality.

For example, U.S. Pat. No. 7,540,030 proposes a system for removal of malicious applications from a computer. For this purpose, a special CHECK scenario is used on the infected computer, which performs a search for malicious applications and for consequences of their operation. In case if the CHECK scenario finds a malicious application, a FIX scenario is run thereafter, which cures the user's computer.

Removal of a malicious application does not guarantee that it will be removed from the computer forever. There are a number of composite malicious applications, which can restore a deleted component using the other components. For instance, U.S. Pat. No. 7,533,131 proposes a method for removal of malicious applications that try to restore copies of themselves. Various solutions, described in U.S. Pubs. No. 2007/143843 and 2006/0130141, are used to determine the effectiveness of the performed treatment by verifying the fact of removal of malicious applications. In addition, even if all components of malicious applications were removed, it is often impossible to completely reverse all consequences of the malicious applications' operation, i.e. created and/or modified files, or created and/or modified registry keys.

Another problem relates to problems that may be caused as side-effects of the removal processes themselves. For example, the treatment of a computer system may require removal of an operating system file that is infected but still necessary for the operating system to work properly; in this case, removal of such a file will not allow the operating system to work correctly or even to load in the first place. Therefore, a solution is needed that can effectively treat infected computer systems while avoiding the problems outlined above.

SUMMARY OF THE INVENTION

One aspect of the invention is directed to removing malware from a computer system. An inspection module obtains an inspection log representing operational history of the operating system and the application programs of the computer system. The inspection log is analyzed to detect a presence of any malware on the computer system. A treatment scenario is generated that defines a plurality of actions to be executed for removing any malware present on the computer system, as detected in the analyzing. The treatment scenario is generated based on the information contained in the inspection log and on a knowledge base of malware removal rules. The generated treatment scenario is evaluated to assess the actions defined in the generated treatment scenario that are associated with a risk of damaging the operating system or the application programs of the computer system. A modified treatment scenario can be created to reduce the risk in response to an assessment of the risk.

According to one embodiment of the invention, a security arrangement for removing malware from a computer system includes computing hardware, including a processor, a data store, and input/output facilities; an operating system and application programs executable on the computing hardware; and an inspection module that monitors operation of the operating system and application programs for a presence of malware, and generates an inspection log representing operational history of the operating system and the application programs. The inspection module passes the inspection log to a log analyzer module that responds by detecting a presence of any malware on the computer system based on information contained in the inspection log and in accordance with a malware knowledge base containing indicia of known malware or non-malware programs.

A treatment scenario execution module obtains a pre-evaluated treatment scenario which defines a plurality of actions to be executed for removing any malware present on the computer system, as detected by the log analyzer module, the pre-evaluated treatment scenario having been generated specifically for use by the computer system by a scenario generator module based on the information contained in the inspection log and on a knowledge base of malware removal rules, the generated treatment scenario having been further pre-evaluated by a scenario side-effect evaluation module based on a knowledge base of side-effects relating to malware treatment actions and on the information contained in the inspection log, such that the actions defined in the generated treatment scenario that are associated with a risk of damaging the operating system or the application programs of the computer system are automatically modified to reduce the risk. The treatment scenario execution module executes the pre-evaluated treatment scenario using the computing hardware.

Another aspect of the invention is directed to a method for removing malware from a computer system having computing hardware, an operating system, and application programs executable on the computing hardware. The method includes: obtaining, from an inspection module having access to the computer system, an inspection log representing operational history of the operating system and the application programs, the inspection log being produced as a result of monitoring of the operating system and application programs for a presence of malware. The inspection log is analyzed to detect a presence of any malware on the computer system based on information contained in the inspection log and in accordance with a malware knowledge base containing indicia of known malware or non-malware programs. A treatment scenario is then generated that defines a plurality of actions to be executed for removing any malware present on the computer system, as detected in the analyzing. The treatment scenario is generated based on the information contained in the inspection log and on a knowledge base of malware removal rules.

The generated treatment scenario is evaluated based on a knowledge base of side-effects relating to malware treatment actions and on the information contained in the inspection log, such that the actions defined in the generated treatment scenario that are associated with a risk of damaging the operating system or the application programs of the computer system are assessed. In response to an assessment of the risk, the method includes creating a modified treatment scenario to reduce the risk. The modified treatment scenario is provided for execution by a treatment scenario execution module operating for the benefit of the computer system.

Advantageously, aspects of the invention provide for an evaluation of the treatment scenario to mitigate risks of the treatment itself. A number of other advantages will be apparent from the following detailed description.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to a creating an effective treatment of a computer against malicious applications and consequences of their operation, by creating a computer treatment scenario taking into account the effectiveness of the treatment and the assessment of the risk of treatment. For this purpose, a system for creating an effective treatment of a computer against malicious applications shown in FIG. 1 is utilized according to one type of embodiment.

Figure 1:
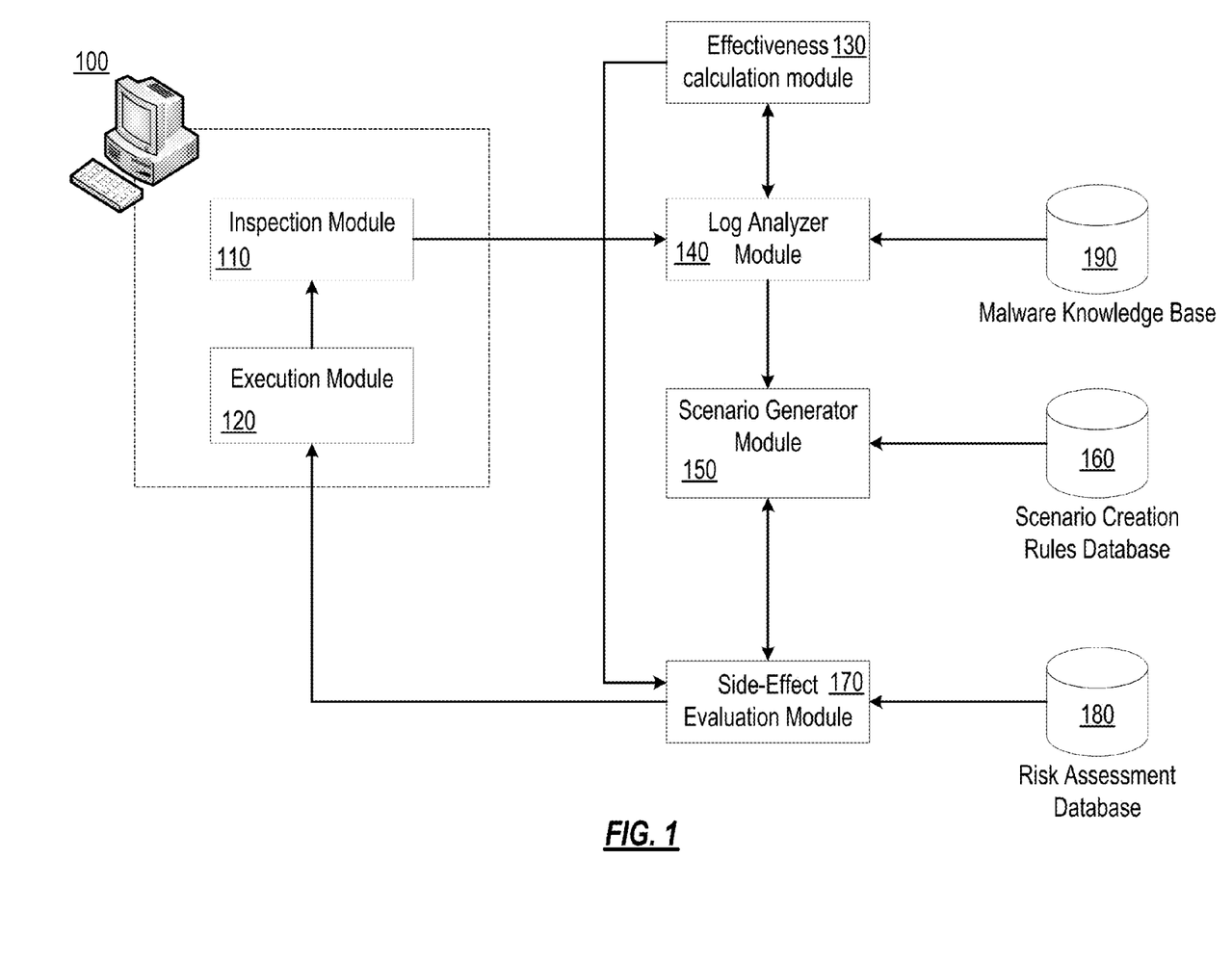
FIG. 1 is a block diagram illustrating a system architecture of an exemplary system of modules with which aspects of the invention can be carried out according to an example embodiment.

FIG. 1 is a block diagram illustrating various operational modules with which some aspects of the invention can be implemented according to various embodiments. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein, unless specifically called out as such.

In FIG. 1, a computer 100, which can be a general purpose personal computer, an example of which is detailed below with reference to FIG. 3, and on which malicious applications may be found, is analyzed using inspection module 110. In one embodiment, inspection module 110 is a locally-running program (or component thereof), though in other embodiments inspection module 110 may be a remotely-hosted application with a local component running on computer system 100 to provide access to the resources and system status information on computer system 100.

According to one example approach, the inspection module 110 can operate using analysis methods known in the art such as, for example, the technique described in U.S. Pat. No. 7,540,030, incorporated by reference herein. As a result of such inspection, the inspection module 110 generates an inspection log with recorded information on the detected malicious applications and effects of their operation. Besides known malicious applications, the inspection log can also capture unknown (suspicious) applications, which have behavior that shows some similarity to malicious activity such as: installation in a hidden (silent) mode, setting autorun registry keys in order to automatically run during the start of the operating system (OS), creating/modifying files in system folders, etc. The inspection module 110 can create an inspection log either at a specified point in time (for example, at the user's request or periodically), or constantly update the inspection log while tracking system events or external events. In a related embodiment, the inspection log records such data as: created/modified files, created/modified registry keys, information on network connections, loaded libraries (such as DLLs), drivers, extension modules, information on the OS installed on the computer, etc. The information may be accessible with various refinement levels—for example, in one embodiment, the data on files include only hash sums of files, while in another embodiment the data can include metadata on the file in the form of size, creation/modification date, name, format, etc.

In one example of a suspicious activity, consider the case of the user's Internet Explorer program having an unknown toolbar installed as an add-on, and the list of the loaded modules of such executable Internet Explorer file being different from the list of the loaded modules of a standard executable Internet Explorer file, and not matching any valid record in a database of known benign applications. In this example case, the information on this version of Internet Explorer will be entered in the inspection log. The toolbar may be a trial version of a third party manufacturer's product, which does not actually present any malicious code; however, this case is precisely the type of situation requiring additional analysis.

Subsequently, the inspection module 110 sends the received inspection log to log analyzer module 140, which analyses the inspection log in order to determine the activity of malicious applications for subsequent removal of both malicious applications and consequences of their operation. Log analyzer module 140, in the embodiment depicted, is implemented in a remote computer system, such as a security service implemented in a cloud computing model. In related embodiments, log analyzer module 140 is implemented as a security server in an enterprise network. In still another embodiment, log analyzer module 140 is implemented at least in part on the local computer system 100.

For its the analysis, the log analyzer module 140 queries a malware knowledge base 190, which contains information on all known malicious applications (the so-called "blacklist") and all known safe or legitimate, i.e., "clean" applications (the so-called "whitelist"). Such information includes metadata on executable files (hash sum, size, name, etc.) and more detailed information on how an application functions: e.g., what files it creates/modifies on the disk, what registry keys it creates/modifies, information on established connections, etc. In one type of embodiment, such information is compared with information from the inspection log, in order to, first, exclude the data related to the operation of clean applications, and second, to identify the information related to malicious applications and effects of their operation.

The malware knowledge base 190 can be updated in several ways. In one type of embodiment, the information on malicious applications is updated by analyzing their operation or by emulating these applications on test computers or virtual machines (such as VirtualPC or VMWare), with subsequent accumulation of all modifications occurring in the actual (or emulated) OS. Information on clean applications can be gathered in a similar manner and also provided by the suppliers of such applications themselves. Moreover, in a related embodiment, both for malicious and clean applications, specific characteristics are determined, which can be used to identify other, similar, applications that are still unknown as either malicious or clean.

Once the log analyzer module 140 has analyzed the inspection log in order to determine the activity of malicious applications and has filtered all information related to clean applications, the log analyzer module 140 also identifies the objects related to malicious applications such as, for example, files and registry keys. The information on such objects is sent to scenario generator module 150, which uses this information to create a scenario for treating the computer 100 from malicious applications and effects of their operation. In one embodiment, the log analyzer module 140 also saves information on the objects related to malicious applications and sends it to effectiveness calculation module 130.

Scenario generator module 150, in the embodiment depicted, is implemented in a remote computer system, such as a security service implemented in a cloud computing model. In related embodiments, scenario generator module 150 is implemented as a security server in an enterprise network. In still another embodiment, scenario generator module 150 is implemented at least in part on the local computer system 100.

According to one embodiment, a scenario for treating computer 100 is composed of a number of actions, which are to be carried out to treat the computer 100 (i.e. disinfect it from malicious applications and the consequences of their operation). Treatment can include such actions as removal of created/modified files, restoration of modified files (primarily system files), restoration/removal of registry keys, termination of processes, etc. To form such actions, computer treatment action templates are employed, which are stored in scenario creation rules database 160.

Once the treatment scenario generator module 150 creates a scenario for treating the computer 100, the scenario is sent to side-effect evaluation module 170 to be checked. Side-effect evaluation module 170, in the embodiment depicted, is implemented in a remote computer system, such as a security service implemented in a cloud computing model. In related embodiments, side-effect evaluation module 170 is implemented as a security server in an enterprise network. In still another embodiment, side-effect evaluation module 170 is implemented at least in part on the local computer system 100.

In one embodiment, the side-effect evaluation module 170 queries risk assessment database 180, where the rules for assessing the actions performed by the computer 100 treatment scenario are stored. The assessment includes comparing the action which will be performed by the computer treatment scenario with the actions which present potential danger for the computer system. For example, a risk for the computer system can consist in the modification of various system objects, such as files.

As a specific example, consider an AVZ scenario:

Example

```
begin
SearchRootkit(true, true);
SetAVZGuardStatus(True);
SetAVZPMStatus(True);
QuarantineFile('C:\WINDOWS\system32\userinit.exe','');
QuarantineFile('C:\Program Files\plugin.exe','');
QuarantineFile('C:\WINDOWS\system32\Drivers\Video3D32.sys','');
DeleteFile('C:\Program Files\plugin.exe');
```

```
****DeleteFile('C:\WINDOWS\system32\userinit.exe');****
  RegKeyStrParamWrite('HKEY_LOCAL_MACHINE','Software\Microsoft\Windows
NT\CurrentVersion\Winlogon','Userinit','C:\WINDOWS\system32\userinit.exe,');
    ExecuteRepair(6);
    ExecuteWizard('TSW', 2, 2, true);
    ExecuteWizard('SCU', 2, 2, true);
    BC_ImportDeletedList;
    ExecuteSysClean;
    BC_Activate;
    RebootWindows(true);
    end.
```

The action set apart in asterisks (****) and underlining removes the infected system file, the consequence of which means that the operating system cannot be loaded any longer. Such action must be replaced with a less extreme measure - for example, restoration of the file from a backup copy presumed to be un-infected.

In one embodiment, an action assessment rule in the risk assessment database 180 includes the following parameters:

Object type: For example, it can be system objects, CLSID, processes, registry keys and autorun elements.

Action: An action can include modification of an object (for example, file editing or process completion), removal (for example, of a registry key), etc.

Risk assessment: This can be represented numerically; in one example, assessments of risks associated with various actions can be added together. Another embodiment divides actions into permissible and impermissible actions in relation to various objects. For example, removal of a system file is an impermissible action, but restoration of that same file is permissible.

In one embodiment, the side-effect evaluation module 170 can be realized in the form of an emulator, which checks the syntactic correctness of a computer 100 treatment scenario and emulates its execution. The emulation results in a list of modified objects (for example, files), which were changed, placed quarantined, removed, etc. The list of modified objects is checked taking into account the action assessment rules from the risk assessment database 180. The emulation can be performed, for example, using a virtual machine, which can be launched using information about the computer 100 (OS parameters, installed drivers, activated services, etc.) as settings. This type of information can be obtained as part of the log provided to log analyzer module 140 in one type of embodiment.

As an example of the operation of the side-effect evaluation module 170 and the risk assessment database 180 according to one embodiment, the risk assessment database 180 contains a list of possible operations in the treatment scenario, along with a risk value for each operation. The risk value can be a numerical value either on a linear scale i.e., such that the risk for a sequence of operations can be represented as a sum of their individual risk values; or in non-linear fashion, e.g., the total risk can be aggregated according to a predefined function where above a certain total risk value, added risks compound with a progressively smaller weighting—thus, the total risk assessment may be expressed as a numerical value between a range of upper and lower limits, say, 0-100. Side-effect evaluation module 170 aggregates the various risk values according to the predefined algorithm, In a related approach, above a certain total compounded risk value, added low-value risks from operations are not accounted for towards the total, while large-value risks are included to further compound the total assessed risk value.

The side-effect evaluation module 170 aggregates the various risk values for the operations of an evaluated treatment scenario, and compares the total risk value against a limit. If the limit is met or exceeded, the side-effect evaluation module 170 concludes that the level of risk for the proposed treatment scenario is too great. Accordingly, side-effect evaluation module 170 passes this evaluation result to treatment scenario generator module 150, which, in turn, responds by reworking the treatment scenario or generating a new treatment scenario that entails less risk of side-effects. In a related embodiment, the evaluation result provided to treatment scenario module 150 is accompanied by an identification of the operations representing the greatest risk values in the rejected treatment scenario. This information is then used by treatment scenario generator module 150 to replace those specific operations with ones aiming to achieve a similar effect but involving less intensive treatment. In one specific approach, the reporting to treatment scenario generator module 150 identifies the largest single contributing operation to the overall risk—accordingly, a rework-reevaluation process takes place in which there may be multiple iterations. In a related approach, the top n operations are identified having risk values meeting a certain condition (e.g., adding up to a value greater than or equal to amount by which the risk limit is exceeded).

In a related embodiment, the risk assessment database 180 identifies impermissible operations for certain objects (e.g. deletion of a critical system file). Expressed another way, risks associated with certain operations are given a large value such that the mere presence of the operation in question would result in the assessed risk being in excess of the applicable limit.

Another embodiment involves a preliminary check of the actions in the computer 100 treatment scenario before its execution, using an analytical assessment of actions based on the risk assessments database 180, which includes expert system data provided and managed by a team of human analysts.

In one embodiment, the end result of the operation of the side-effect evaluation module 170 is a determination, pursuant to which the computer treatment scenario will be either sent to the computer 100 for execution by treatment scenario execution module 120, or the computer treatment scenario will be sent back to the scenario generator module 150, with an indication of the list of the determined impermissible actions relating to various targeted objects to be treated on computer 100.

In one embodiment, the determination by the side-effect evaluation module 170 to revise the computer treatment scenario using the scenario generator module 150 can be issued immediately in case of a detection of a first impermissible action. In another embodiment, the determination of the side-effect evaluation module 170 to revise the computer treatment scenario using the treatment scenario generator module 150 can be issued after a plurality of detections of impermissible actions (possible all impermissible actions) in the scenario, which actions must be corrected. In yet another embodiment, the determination of the side-effect evaluation module 170 on revising the computer treatment scenario using the scenario generator module 150 can be issued in case of exceeding a pre-set threshold representing a maximum tolerable level of risk, based on detected actions in the scenario, each of which has its own risk assessment. In this latter case, the computer treatment scenario risk threshold can be calculated by adding together the risk assessments of each detected action.

In a related embodiment, several iterations of computer treatment scenario editing with the scenario generator module 150 will provide a computer treatment scenario which will not present a danger for the computer 100 and which will be sent for execution using the treatment scenario execution module 120. In one embodiment, the most dangerous actions in the computer treatment scenario will be removed at once (for example, deletion of system files) or replaced with less dangerous ones (for example, an action to delete an infected system file will be replaced with an action to restore the file from a saved copy).

In one embodiment, scenario execution module 120 is a locally-running program (or component thereof), though in other embodiments scenario execution module 120 may be a remotely-hosted application with a local component running on computer system 100 to provide access to the resources and rights to perform modification of computer system 100.

In accordance with one embodiment, treatment of malicious applications can be performed using several distinct scenario execution modules 120; their quantity can vary as appropriate. For example, one of the scenario execution modules 120 can be used to detect serious system problems, which could be received as a result, of changes in the system registry made by a malicious application. These changes can result in various dysfunctions in applications, processes, etc.

Another example of a scenario execution module 120 is a security settings module. This module may be utilized to eliminate various problems in the system, such as, for example, autorun authorization from flash devices, installation and launch of ActiveX components without authorization, etc. Yet another example of a scenario execution module 120 is a confidential information removal module. This module finds and removes the results of user actions, such as, for example, various browser logs, cached data, cookies, passwords for various programs and sites, etc.

In one embodiment, once the treatment scenario execution module 120 has executed the received computer treatment scenario, the inspection module 110 will create a follow-up inspection log and will send it to the log analyzer module 140. The log analyzer module 140 analyzes the follow-up inspection log in order to determine the activity of malicious applications need for any further removal of both malicious applications themselves and effects of their operation. Also, the log analyzer module 140 can send information on the objects related to the malicious applications to the effectiveness calculation module 130, which contains saved information on the objects found during the previous inspection log analysis. By comparing information on the objects related to malicious applications found during the current analysis of the inspection log and the analysis of the previous iteration's inspection log, the effectiveness calculation module 130 determines the treatment effectiveness. In one embodiment, the treatment effectiveness can be calculated using the following formula:

$$\text{Effectiveness} = (X1 - X2)/X1$$

Where X1 is the number of objects related to malicious applications found during the previous iteration of the computer 100 scan, and X2 is the number of objects related to malicious applications found during the current iteration of the computer 100 scan.

In other embodiments, the treatment effectiveness is also assessed based on several other parameters, such as a number of actions performed using the treatment scenario execution module 120, an analysis of complex actions performed by malicious applications in a certain period of time, etc.

After the assessment of the treatment effectiveness, the effectiveness calculation module 130 determines the need for further treatment of the computer 100 by comparing the treatment effectiveness with a preset threshold, which can be either set empirically by experts, or automatically modified based on the statistics gathered in the malware knowledge base 190. For example, if the treatment effectiveness calculated using the formula above equals 1, it means that all objects related to malicious applications were removed and/or modified, and no further treatment is required.

In one embodiment, further treatment of the computer 100 is performed in cases where at least one object related to malicious applications is left. In another embodiment, further treatment of the computer 100 is suspended in case if the effectiveness of each subsequent treatment equals zero, i.e. it is not possible to remove the objects related to malicious applications. In yet another embodiment, further treatment of the computer 100 is suspended in case if the effectiveness of each subsequent treatment does not change.

In yet another embodiment, further treatment of the computer 100 involves correction of the assessments of the risk of the treatment scenario actions which were blocked using the side-effect evaluation module 170, with the help of the statistics accumulated in the malware knowledge base 190. For example, such correction provides an opportunity to perform actions with system files which were prohibited due to high danger ratings. Admissible actions can include restorations of files or modification of existing files, which will enable increasing the effectiveness of further treatment.

Therefore, in this embodiment, achieving a higher treatment effectiveness can require actions that have high risk ratings. Accordingly, the side-effect evaluation module 170, interacting with scenario generator module 150, select a most appropriate set of risk/effectiveness criteria (according to predefined logic) for the treatment of the computer, taking into account the admissible limits of both parameters.

For instance, various operations to deal with a given problem can be analyzed in order of decreasing effectiveness, beginning with operations deemed most effective. The side-effect evaluation module 170 checks the risk value in a generated treatment scenario by scenario generator module 150 and, if the risk value exceeds a threshold, then the reworking of the treatment scenario can produce a less effective but also less risky alternative treatment scenario. For example, where an unauthorized change to a dynamic link library (DLL) has been detected, a more effective treatment scenario to try first can involve removing the DLL. This type of operation can result in loss of desired operation of certain programs, however. Thus, the removal operation is associated with a very high risk value. In a subsequent iteration, the scenario generator module 150 can call for replacing of the DLL with an earliest available version. This scenario is less effective since the earlier version can still be corrupted; however it also carries less risk because the most of the DLL since the last update will be available for programs.

In a related example, side-effect evaluation module 170 examines the risks given the present system configuration and programs installed. To support this level of evaluation, risk assessment database 180 includes information on various versions of the DLL, and which minimum versions are needed by the installed programs on the computer system. The side-effect evaluation module 170 thus manages risk by selecting the earliest version of the DLL with which to replace the corrupted newest version while permitting the other programs to retain their operability. There may be a situation in which the system determines that the computer system cannot be effectively treated without resulting in the risk of side-effects being above the set threshold. In this case, the user can be notified about the proposed treatment, and authorization may be sought from the user or administrator to perform the treatment with the high-risk trade-off. The user or administrator could thus be made aware of the possible side-effects of the treatment and can respond accordingly (e.g., obtaining a replacement copy of the latest DLL). Likewise, the user or administrator is given the option to select a less effective treatment (i.e., accepting a risk that the infection might not be fully neutralized) in favor of retaining functionality of a critical program. There may indeed be time-sensitive program operability that cannot be compromised, though at a later time, the more effective treatment can be applied once the time-sensitivity has expired.

If the effectiveness of the actions cannot be increased by increasing the risk rating, the computer treatment scenario will be improved by a specialist. However, for a number of actions, the danger rating cannot be increased because execution of these actions can result in a crash of the operating system on the computer 100. In some embodiments, if appropriate effectiveness cannot be achieved due to a high rating of the risk of the actions, other possibilities can be used—for example, postponing the execution of the scenario until the accumulation of the most appropriate options of implementation of a new computer treatment scenario in the malware knowledge base 190, or adding a possibility of booting from an alternative storage medium for system restoration to the treatment scenario.

Figure 2:
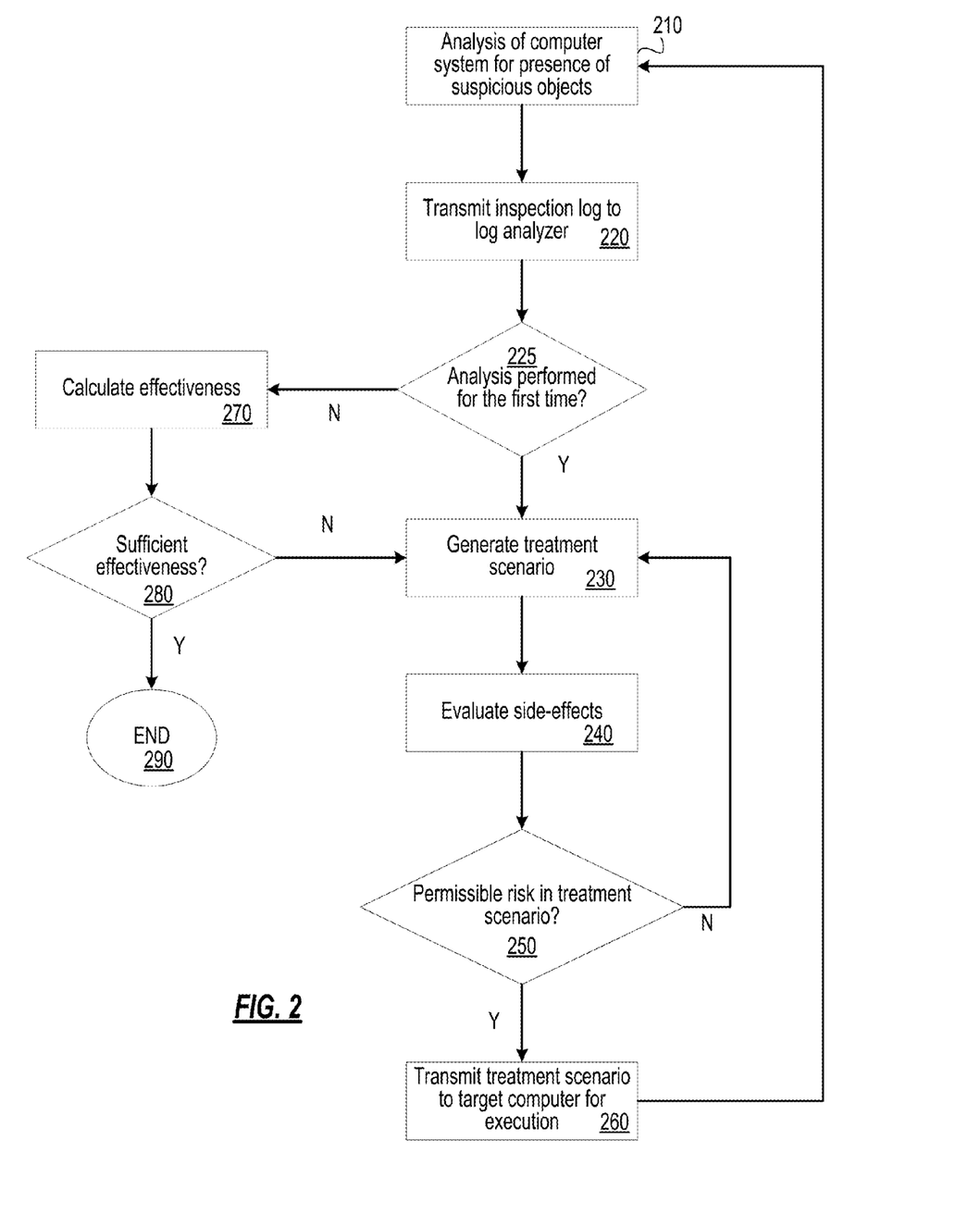
FIG. 2 is a flow diagram illustrating a process of evaluating and removing malware or suspicious objects from a target computer system according to aspects of the invention.

FIG. 2 is a flow diagram illustrating a method for choosing an effective treatment of the computer against malicious applications and consequences of their operation. At 210, a user computer 100, on which malicious applications may be found, is analyzed using inspection module 110. The operation of inspection module 110 at this stage may or may not be triggered by activity deemed suspicious. The inspection module 110 can be operated periodically, or in response to some event.

At 220, the inspection module 110 sends the inspection log generated as a result of the inspection operations to the log analyzer module 140, which can be hosted locally or remotely, and which analyzes the inspection log in order to determine the presence of any suspicious or malicious applications. In various embodiments, the log analyzer module 140 filters all information related to known benign applications (for either processes or threads). The log analyzer module 140 also highlights, or identifies the particular objects giving rise to its determination of suspiciousness or possible maliciousness of applications. Examples of such objects include files and registry keys. If such objects are found, the method proceeds to block 225.

At 225, a check is made as to whether the analysis is performed in the first instance. If the analysis is the first one, the method advances to 230. If the analysis is not being performed for the first time, block 270 assesses the treatment effectiveness using the effectiveness calculation module 130. Block 280 checks whether the treatment effectiveness is sufficient (based on a comparison against predefined criteria, for example), and, if it is, the process concludes at 290.

In a related embodiment, further treatment of the computer 100 is suspended if the effectiveness of one or more subsequent treatments equals zero, i.e., if the objects related to malicious applications cannot be removed. In another embodiment, in order to increase treatment effectiveness, a human or automated expert is called upon at this stage to apply more advanced experience and employ set of utilities (e.g., with anti-rootkit functionality, detection of malicious programs such as fake antivirus programs, bots, etc.) to assess the remaining malicious or suspicious applications and the consequences of their operation.

The information on the objects related to malicious or suspicious applications is sent to the scenario generator module 150, which uses the information to create a scenario for treating the computer 100 against malicious applications and consequences of their operation at 230. The scenario for treating the computer 100 against malicious applications and consequences of their operation can be created using the scenario generator module 150 automatically, manually with the help of a human or automated expert, or using a combination of the above methods.

At 240, the obtained scenario for treating the computer 100 is checked using the side-effects evaluation module 170 in order to identify any actions which present a potential risk to the operability or integrity of the computer system 100. Block 250 checks the compliance of the computer treatment scenario with the criteria of risk for the computer system 100 and of treatment effectiveness. This criteria can be predefined based on a default level, or can be adjustable under the control of a system administrator, for example. In a related embodiment, the criteria is dynamic, and is automatically adjusted based on changing circumstances, such as the extant threat level reported by a monitoring service. If the response is positive, the treatment scenario is sent for execution at 260. Subsequently, the method is started again from 210, until acceptable treatment effectiveness is achieved, as determined at 280.

Figure 3:
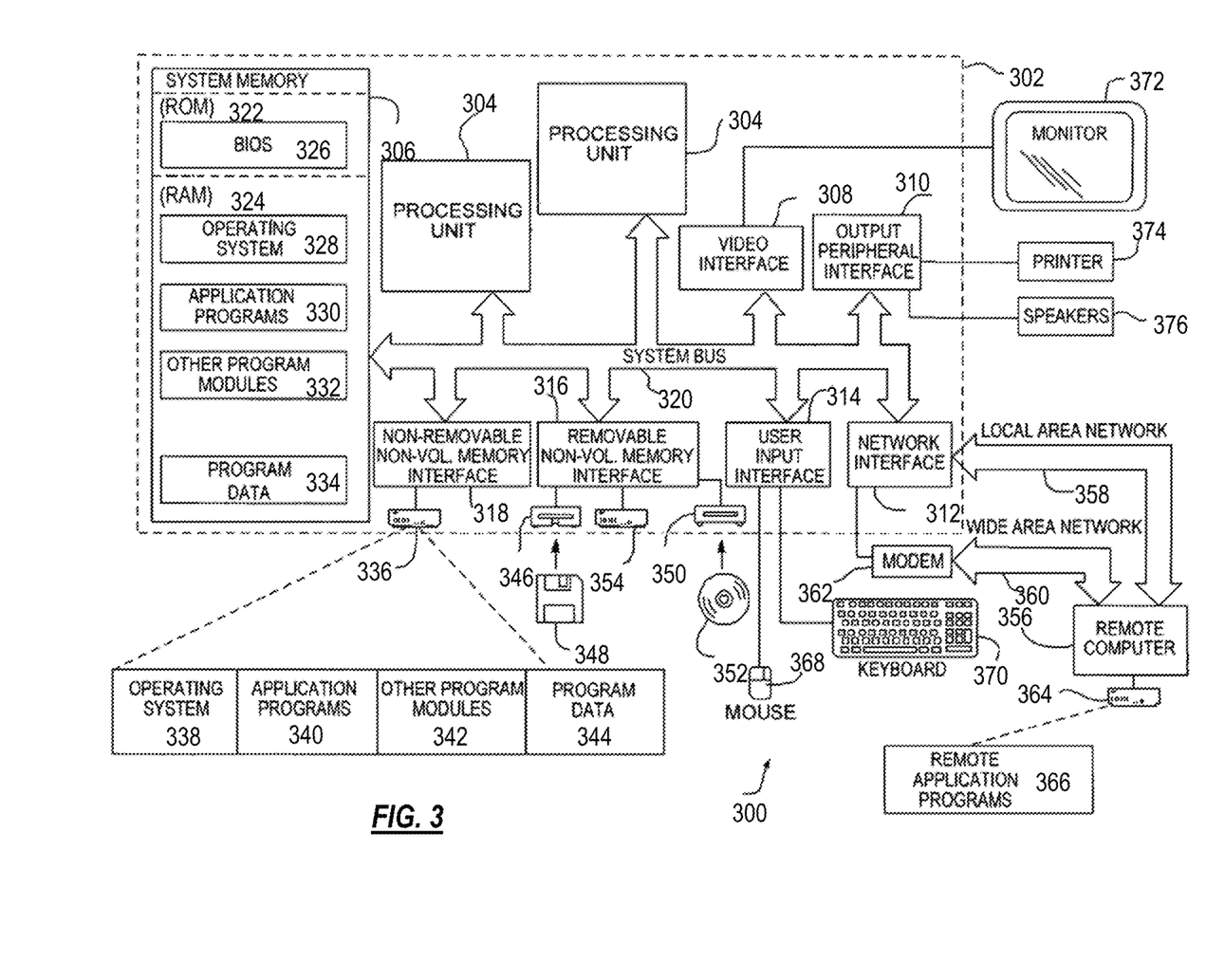
FIG. 3 is a block diagram illustrating a general-purpose computer system with which aspects of the invention may be implemented according to certain embodiments.

FIG. 3 is a diagram illustrating in greater detail a computer system 300 on which aspects of the invention as described herein may be implemented according to various embodiments. The computer system 300 may include a computing device such as a personal computer 302. The personal computer 302 includes one or more processing units 304, a system memory 306, a video interface 308, and input/output facilities such as an output peripheral interface 310, a network interface 312, a user input interface 314, removable 316 and non-removable 318 memory interfaces and a system bus or high-speed communications channel 320 coupling the various components. In various embodiments, the processing units 304 may have multiple logical cores that are able to process information stored on computer readable media such as the system memory 306 or memory attached to the removable 316 and non-removable 318 memory interfaces 318. The computer 302 system memory 306 may include non-volatile memory such as Read Only Memory (ROM) 322 or volatile memory such as Random Access Memory (RAM) 324. The ROM 322 may include a basic input/output system (BIOS) 326 to help communicate with the other portion of the computer 302. The RAM 324 may store portions of various software applications such as the operating system 328, application programs 330 and other program modules 332. Further, the RAM 324 may store other information such as program or application data 334. In various embodiments, the RAM 324 stores information that requires low-latencies and efficient access, such as programs and data being manipulated or operated on. In various embodiments RAM 324 comprises Double Data Rate (DDR) memory, Error Correcting memory (ECC) or other memory technologies with varying latencies and configurations such as RAMBUS or DDR2 and DDR3. In this way, in various embodiments, the system memory 306 may store the input data store, access credential data store, operating memory data store, instruction set data store, analysis result data store and the operating memory data store. Further, in various embodiments, the processing units 304 may be configured to execute instructions that limit access to the aforementioned data stores by requiring access credential before access to the information is granted.

The removable 316 and non-removable 318 memory interfaces may couple the computer 302 to disk drives 336 such as SSD or rotational disk drives. These disk drives 336 may provide further storage for various software applications such as the operating system 338, application programs 340 and other program modules 342. Further, the disk drives 336 may store other information such as program or application data 344. In various embodiments, the disk drives 336 store information that doesn't require the same low-latencies as in other storage mediums. Further, the operating system 338, application program 340 data, program modules 342 and program or application data 344 may be the same information as that stored in the RAM 324 in various embodiments mentioned above or it may be different data potentially derivative of the RAM 324 stored data.

Further, the removable non-volatile memory interface 316 may couple the computer 302 to magnetic portable disk drives 346 that utilize magnetic media such as the floppy disk 348, Iomega® Zip or Jazz, or optical disk drives 350 that utilize optical media 352 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 302 may utilize the network interface 312 to communicate with one or more remote computers 356 over a local area network (LAN) 358 or a wide area network (WAN) 360. The network interface 312 may utilize a Network Interface Card (NIC) or other interface such as a modem 362 to enable communication. The modem 362 may enable communication over telephone lines, coaxial, fiber optic, powerline, or wirelessly. The remote computer 356 may contain a similar hardware and software configuration or may have a memory 364 that contains remote application programs 366 that may provide additional computer readable instructions to the computer 302. In various embodiments, the remote computer memory 364 can be utilized to store information such as identified file information that may be later downloaded to local system memory 306. Further, in various embodiments the remote computer 356 may be an application server, an administrative server, client computers, or a network appliance.

A user may enter information to the computer 302 using input devices connected to the user input interface 314 such as a mouse 368 and keyboard 370. Additionally, the input device may be a trackpad, fingerprint scanner, joystick, barcode scanner, media scanner or the like. The video interface 308 may provide visual information to a display such as a monitor 372. The video interface 308 may be an embedded interface or it may be a discrete interface. Further, the computer may utilize a plurality of video interfaces 308, network interfaces 312 and removable 316 and non-removable 318 interfaces in order to increase the flexibility in operation of the computer 302. Further, various embodiments utilize several monitors 372 and several video interfaces 308 to vary the performance and capabilities of the computer 302. Other computer interfaces may be included in computer 302 such as the output peripheral interface 310. This interface may be coupled to a printer 374 or speakers 376 or other peripherals to provide additional functionality to the computer 302.

Various alternative configurations and implementations of the computer 302 are within the spirit of the invention. These variations may include, without limitation, additional interfaces coupled to the system bus 320 such as universal serial bus (USB), printer port, game port, PCI bus, PCI Express or integrations of the various components described above into chipset components such as the northbridge or southbridge, for example. In various embodiments, the processing unit 304 may include an embedded memory controller (not shown) to enable more efficient transfer of data from the system memory 306 than the system bus 320 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A security arrangement for removing malware from a computer system, the security arrangement comprising:
   computing hardware, including a processor, a data store, and input/output facilities;
   an operating system and application programs executable on the computing hardware;
   an inspection module that monitors operation of the operating system and application programs for a presence of malware, and generates an inspection log representing operational history of the operating system and the application programs;
   wherein the inspection module passes the inspection log to a log analyzer module operating on a remote service that responds by detecting a presence of any malware on the computer system based on information contained in the inspection log and in accordance with a malware knowledge base containing indicia of known malware or non-malware programs; and
   a treatment scenario execution module that obtains, from the remote service a pre-evaluated treatment scenario which contains a specific set of instructions that represent a sequence of actions to be executed for removing any malware present on the computer system, as detected by the log analyzer module, the pre-evaluated treatment scenario having been generated specifically for use by the computer system by a scenario generator module based on the information contained in the inspection log and on a knowledge base of malware removal rules, the generated treatment scenario having been further pre-evaluated by a scenario side-effect evaluation module based on a knowledge base of side-effects relating to malware treatment actions and on the information contained in the inspection log, such that the actions represented by the instructions of the generated treatment scenario that are associated with a risk of damaging the operating system or the application programs of the computer system are automatically modified to reduce the risk; and wherein the treatment scenario execution module executes the pre-evaluated treatment scenario using the computing hardware.

2. The security arrangement of claim 1, wherein the inspection log further comprises configuration information about the computer system sufficient for configuring a virtual machine emulator to emulate at least a portion of the computer system.

3. The security arrangement of claim 1, wherein the remote service executes the log analyzer module, the scenario generator module, and the scenario side-effect evaluation module.

4. The security arrangement of claim 1, wherein the inspection module causes the inspection log to be transmitted to a local service executing on the computing hardware, and wherein the treatment scenario execution module receives the pre-evaluated treatment scenario from the remote service, wherein the remote service executes the log analyzer module, the scenario generator module, and the scenario side-effect evaluation module.

5. The security arrangement of claim 1, wherein the generated treatment scenario is pre-evaluated by an emulation process that models the computer system while it executes the generated treatment scenario, wherein in the emulation process a risk of damage to the operating system or application programs is detected and, as a result of detection of any such risk of damage, the generated treatment scenario is modified to change a malware treatment action such that the risk of damage is reduced.

6. The security arrangement of claim 1, wherein the generated treatment scenario is pre-evaluated such that the risk of damaging the operating system or the application programs of the computer system is represented as a numerical sum of individually-assessed risk values, and wherein that numerical sum is compared against a threshold to determine whether the generated treatment scenario may be provided to the treatment scenario execution module for execution.

7. The security arrangement of claim 1, wherein the generated treatment scenario is pre-evaluated by the scenario side-effect evaluation module such that the actions defined in the generated treatment scenario that are associated with a risk of damaging the operating system or the application programs of the computer system are automatically modified to reduce the risk if an assessed risk level exceeds a reference risk threshold.

8. The security arrangement of claim 1, wherein the inspection log generates a follow-up inspection log in response to execution of the treatment scenario by the treatment scenario execution module, and passes the follow-up inspection log to the log analyzer module, wherein the log analyzer module detects a further presence of any malware on the computer system based on information contained in the follow-up inspection log and in accordance with the malware knowledge base, and wherein an effectiveness is determined based on a comparison of detected malware prior to the execution of the treatment scenario, and subsequent to the execution of the treatment scenario.

9. The security arrangement of claim 1, wherein the generated treatment scenario is pre-evaluated by the scenario side-effect evaluation module such that the actions defined in the generated treatment scenario that are associated with a risk of damaging the operating system or the application programs of the computer system are automatically modified to reduce the risk if an assessed risk level exceeds a reference risk threshold;

wherein the inspection module generates a follow-up inspection log in response to execution of the treatment scenario by the treatment scenario execution module, and passes the follow-up inspection log to the log analyzer module, wherein the log analyzer module detects a further presence of any malware on the computer system based on information contained in the follow-up inspection log and in accordance with the malware knowledge base, and wherein an effectiveness is determined based on a comparison between detected malware prior to the execution of the treatment scenario, and subsequent to the execution of the treatment scenario; and wherein in response to an effectiveness determination falling below an effectiveness threshold, the reference risk threshold is automatically increased to reduce a sensitivity of risk determination.

10. A method for removing malware from a remote computer system having computing hardware, an operating system, and application programs executable on the computing hardware, the method comprising:

obtaining, from an inspection module having access to the remote computer system, an inspection log representing operational history of the operating system and the application programs, the inspection log being produced as a result of monitoring of the operating system and application programs for a presence of malware;

analyzing the inspection log to detect a presence of any malware on the computer system based on information contained in the inspection log and in accordance with a malware knowledge base containing indicia of known malware or non-malware programs;

generating a treatment scenario that contains a specific set of instructions that represent a sequence of actions to be executed for removing any malware present on the computer system, as detected in the analyzing, wherein the treatment scenario is generated based on the information contained in the inspection log and on a knowledge base of malware removal rules;

evaluating the generated treatment scenario based on a knowledge base of side-effects relating to malware treatment actions and on the information contained in the inspection log, such that the actions represented by the instructions of the generated treatment scenario that are associated with a risk of damaging the operating system or the application programs of the computer system are assessed;

in response to an assessment of the risk, creating a modified treatment scenario to reduce the risk; and providing the modified treatment scenario for execution by a treatment scenario execution module operating on the remote computer system.

11. The method of claim 10, further comprising:
in the evaluating of the generated treatment scenario, configuring a virtual machine emulator to emulate at least a portion of the computer system.

12. The method of claim 10, wherein the obtaining, the analyzing, the generating, the evaluating, and the creating of the modified treatment scenario is performed on a security server situated remotely from the computer system.

13. The method of claim 10, wherein the generated treatment scenario is pre-evaluated by an emulation process that models the computer system while it executes the generated treatment scenario, wherein in the emulation process a risk of damage to the operating system or application programs is detected and, as a result of detection of any such risk of damage, the generated treatment scenario is modified to change a malware treatment action such that the risk of damage is reduced.

14. The method of claim 10, wherein in the evaluating, the generated treatment scenario is evaluated such that the risk of damaging the operating system or the application programs of the computer system is represented as a numerical sum of individually-assessed risk values, and wherein that numerical sum is compared against a threshold to determine whether the generated treatment scenario may be provided to the treatment scenario execution module for execution.

15. The method of claim 10, wherein in the evaluating, the generated treatment scenario is evaluated by the scenario side-effect evaluation module such that the actions defined in the generated treatment scenario that are associated with a risk of damaging the operating system or the application programs of the computer system are automatically modified to reduce the risk if an assessed risk level exceeds a reference risk threshold.

16. The method of claim 10, further comprising:
obtaining, from the inspection module, a follow-up inspection log in response to execution of the treatment scenario by the treatment scenario execution module; and
detecting a further presence of any malware on the computer system based on information contained in the follow-up inspection log and in accordance with the malware knowledge base, and wherein an effectiveness is determined based on a comparison of detected malware prior to the execution of the treatment scenario, and subsequent to the execution of the treatment scenario.

17. The method of claim 10, wherein in the evaluating, the generated treatment scenario is evaluated such that the actions defined in the generated treatment scenario that are associated with a risk of damaging the operating system or the application programs of the computer system are automatically modified to reduce the risk if an assessed risk level exceeds a reference risk threshold;
wherein the inspection module generates a follow-up inspection log in response to execution of the treatment scenario by the treatment scenario execution module, and further comprising:
detecting a further presence of any malware on the computer system based on information contained in the follow-up inspection log and in accordance with the malware knowledge base, and
determining an effectiveness based on a comparison between detected malware prior to the execution of the treatment scenario, and subsequent to the execution of the treatment scenario; and
in response to an effectiveness determination falling below an effectiveness threshold, increasing the reference risk threshold to reduce a sensitivity of risk determination.

18. A system for removing malware from a computer system having computing hardware, an operating system, and application programs executable on the computing hardware, the system comprising:
means for obtaining, from an inspection module having access to the computer system, an inspection log representing operational history of the operating system and the application programs, the inspection log being produced as a result of monitoring of the operating system and application programs for a presence of malware;
means for analyzing the inspection log to detect a presence of any malware on the computer system based on information contained in the inspection log and in accordance with a malware knowledge base containing indicia of known malware or non-malware programs;
means for generating a treatment scenario that contains a specific set of instructions that represent a sequence of actions to be executed for removing any malware present on the computer system, as detected in the analyzing, wherein the treatment scenario is generated based on the information contained in the inspection log and on a knowledge base of malware removal rules;
means for evaluating the generated treatment scenario based on a knowledge base of side-effects relating to malware treatment actions and on the information contained in the inspection log, such that the actions represented by the instructions of the generated treatment scenario that are associated with a risk of damaging the operating system or the application programs of the computer system are assessed;
means for creating a modified treatment scenario to reduce the risk in response to an assessment of the risk; and
means for providing the modified treatment scenario for execution by a treatment scenario execution module operating for the benefit of the computer system.

* * * * *